Feb. 28, 1956 S. H. PERKY 2,736,275
SHREDDED CEREAL APPARATUS
Filed Aug. 16, 1948 7 Sheets-Sheet 1
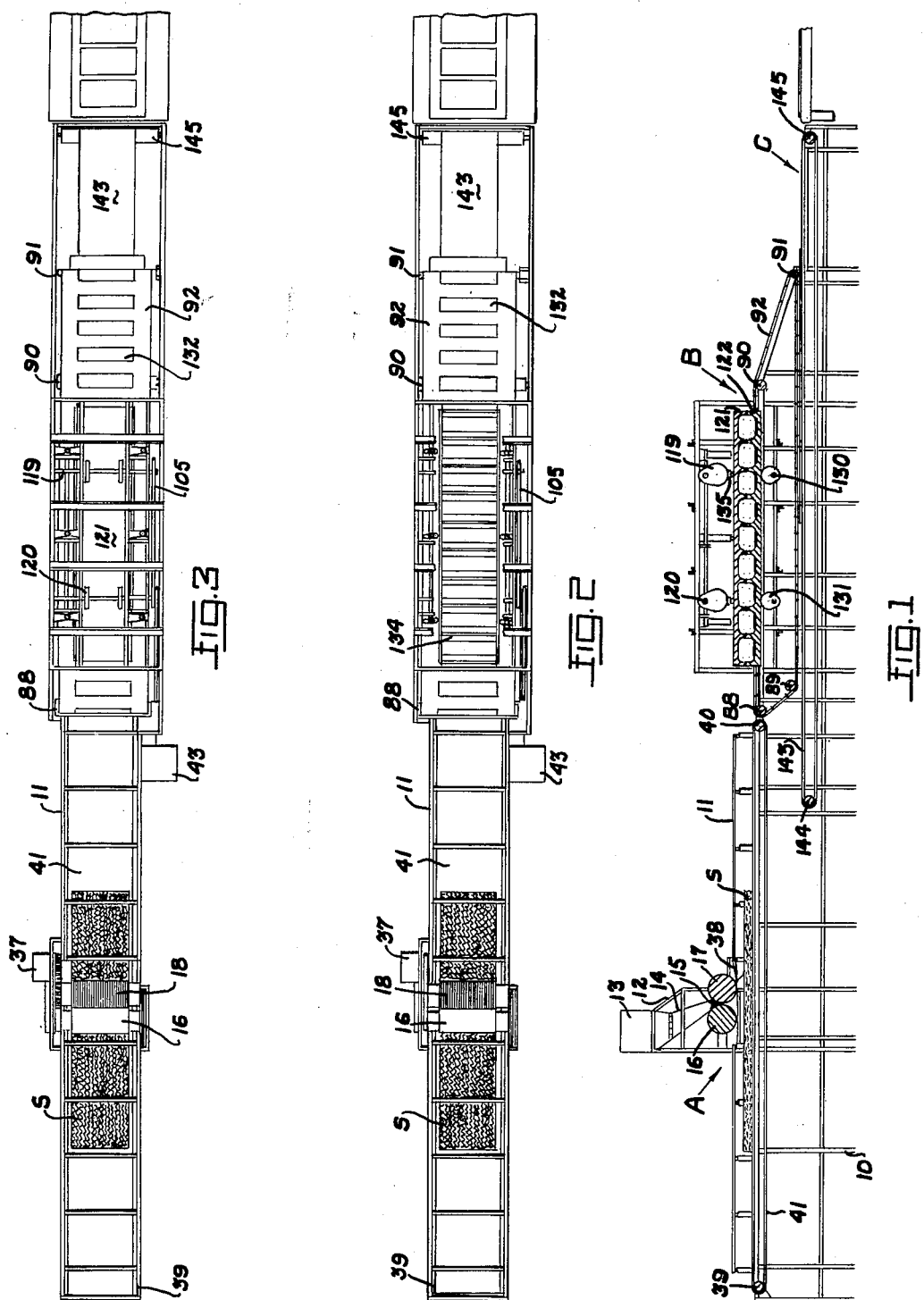
INVENTOR
SCOTT H. PERKY
BY Toulmin & Toulmin
ATTORNEYS Feb. 28, 1956
S. H. PERKY
2,736,275
SHREDDED CEREAL APPARATUS
Filed Aug. 16, 1948
7 Sheets-Sheet 2
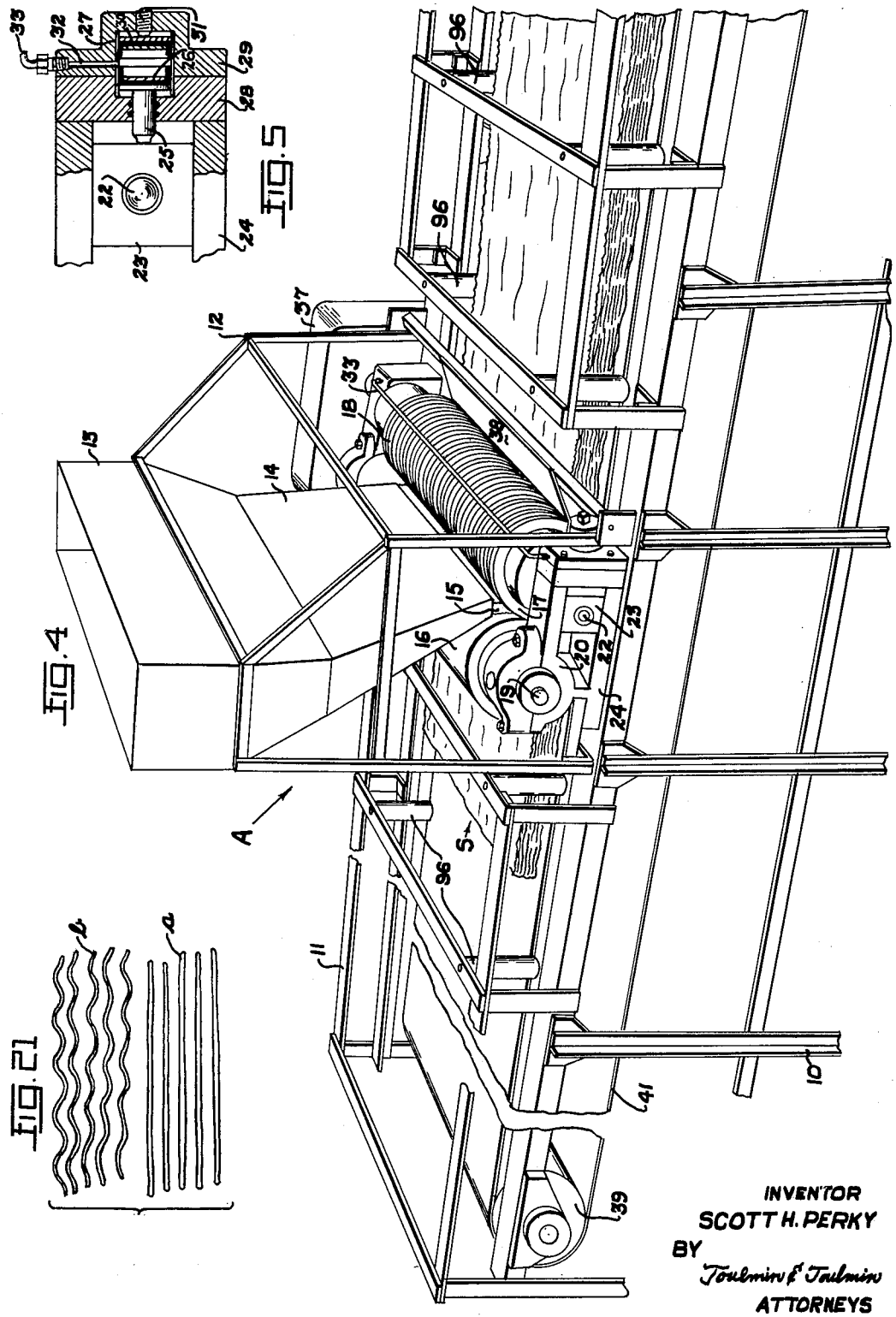
INVENTOR
SCOTT H. PERKY
BY
Toulmin & Toulmin
ATTORNEYS

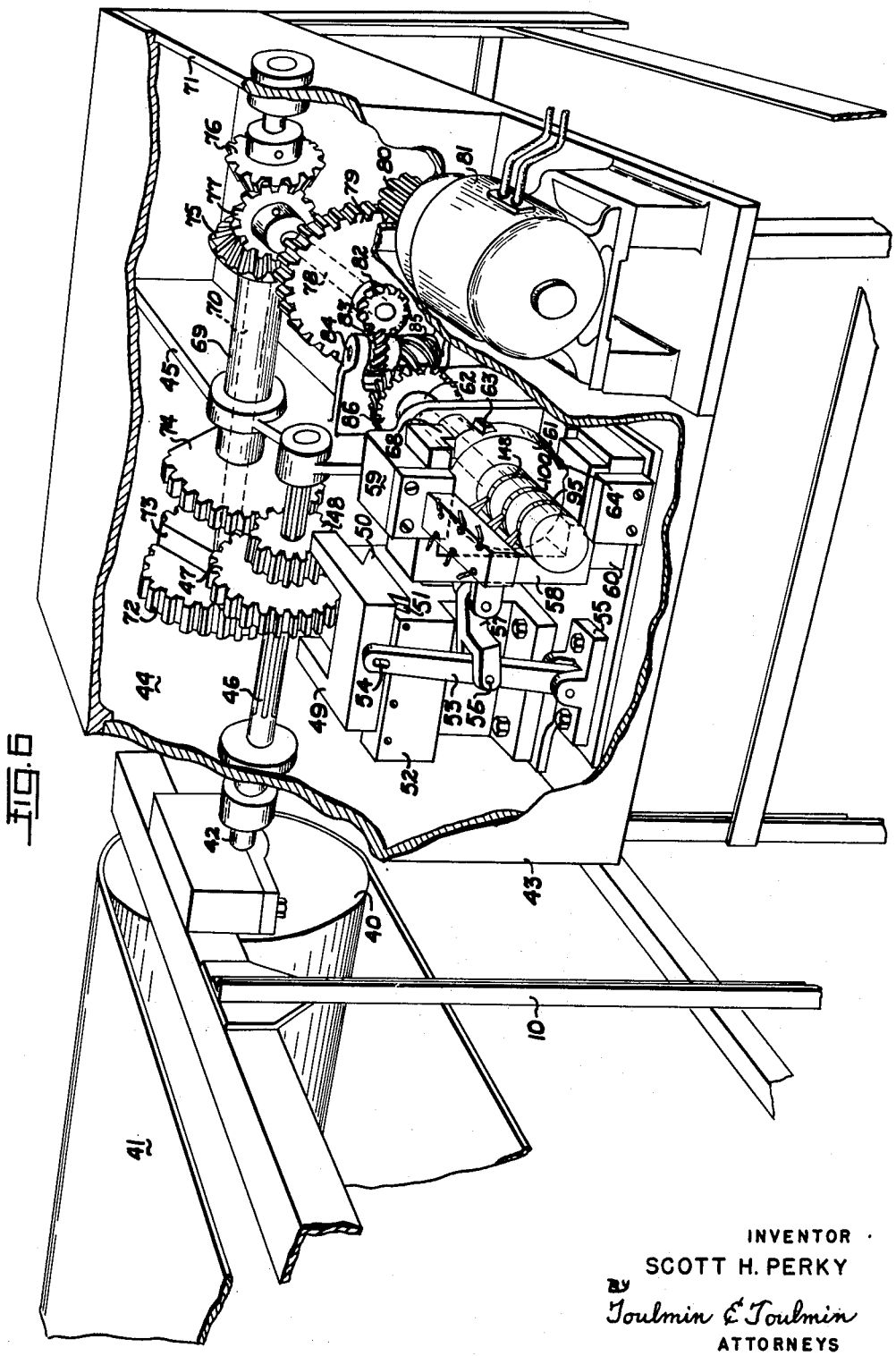

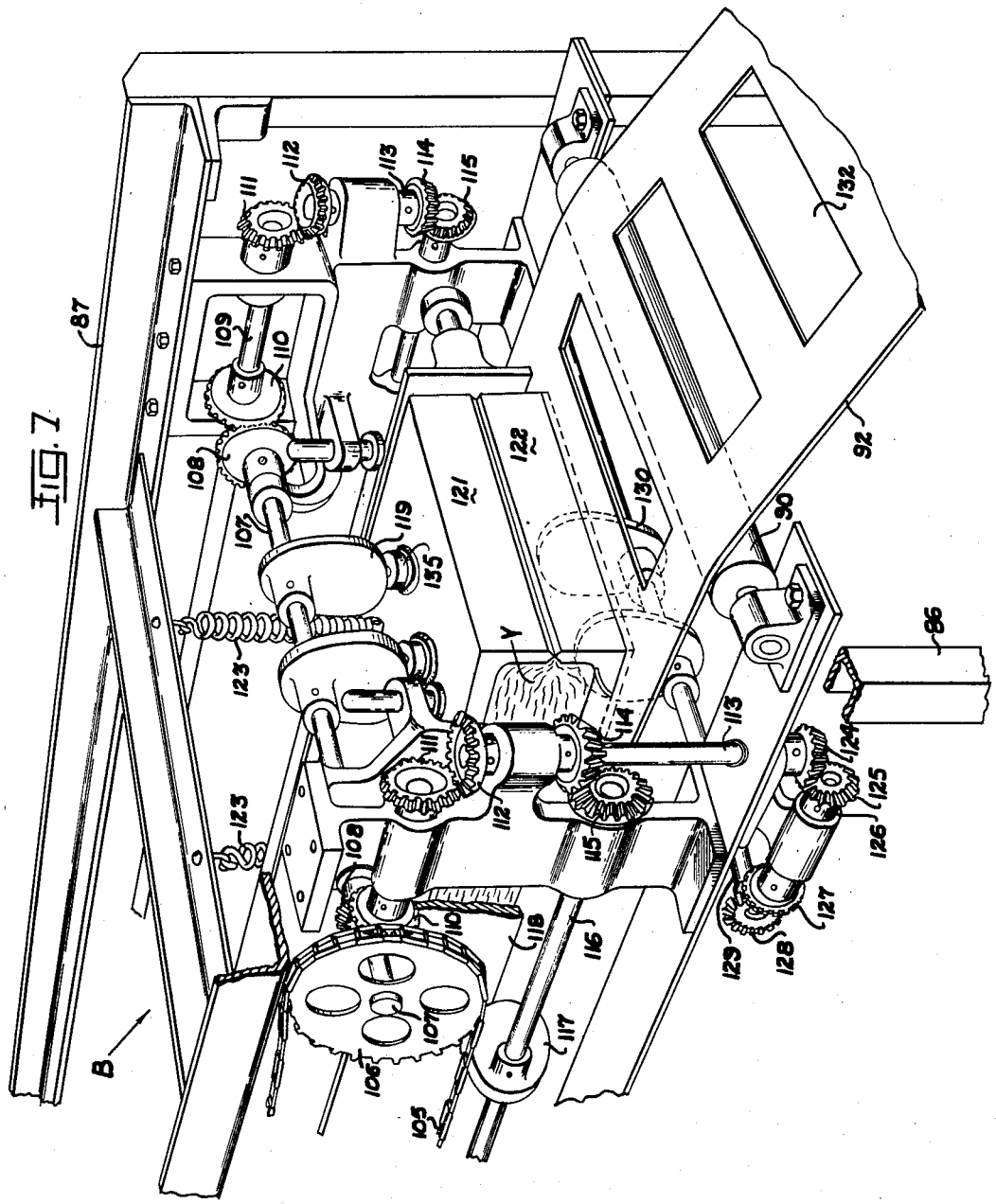

Feb. 28, 1956 S. H. PERKY 2,736,275
SHREDDED CEREAL APPARATUS
Filed Aug. 16, 1948 7 Sheets-Sheet 5
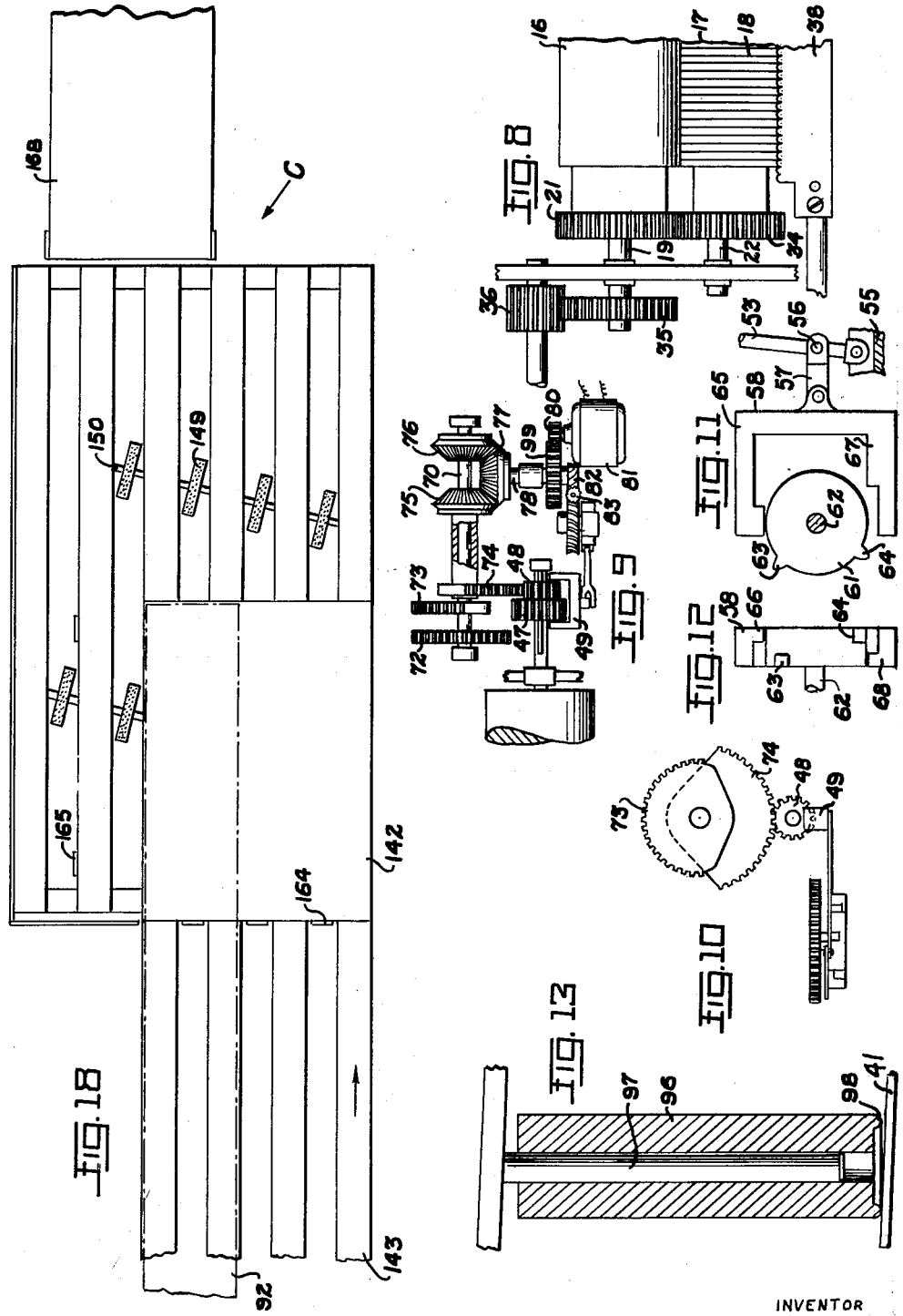
INVENTOR
SCOTT H. PERKY
BY
Toulmin & Toulmin
ATTORNEYS Feb. 28, 1956 S. H. PERKY 2,736,275
SHREDDED CEREAL APPARATUS
Filed Aug. 16, 1948 7 Sheets-Sheet 6
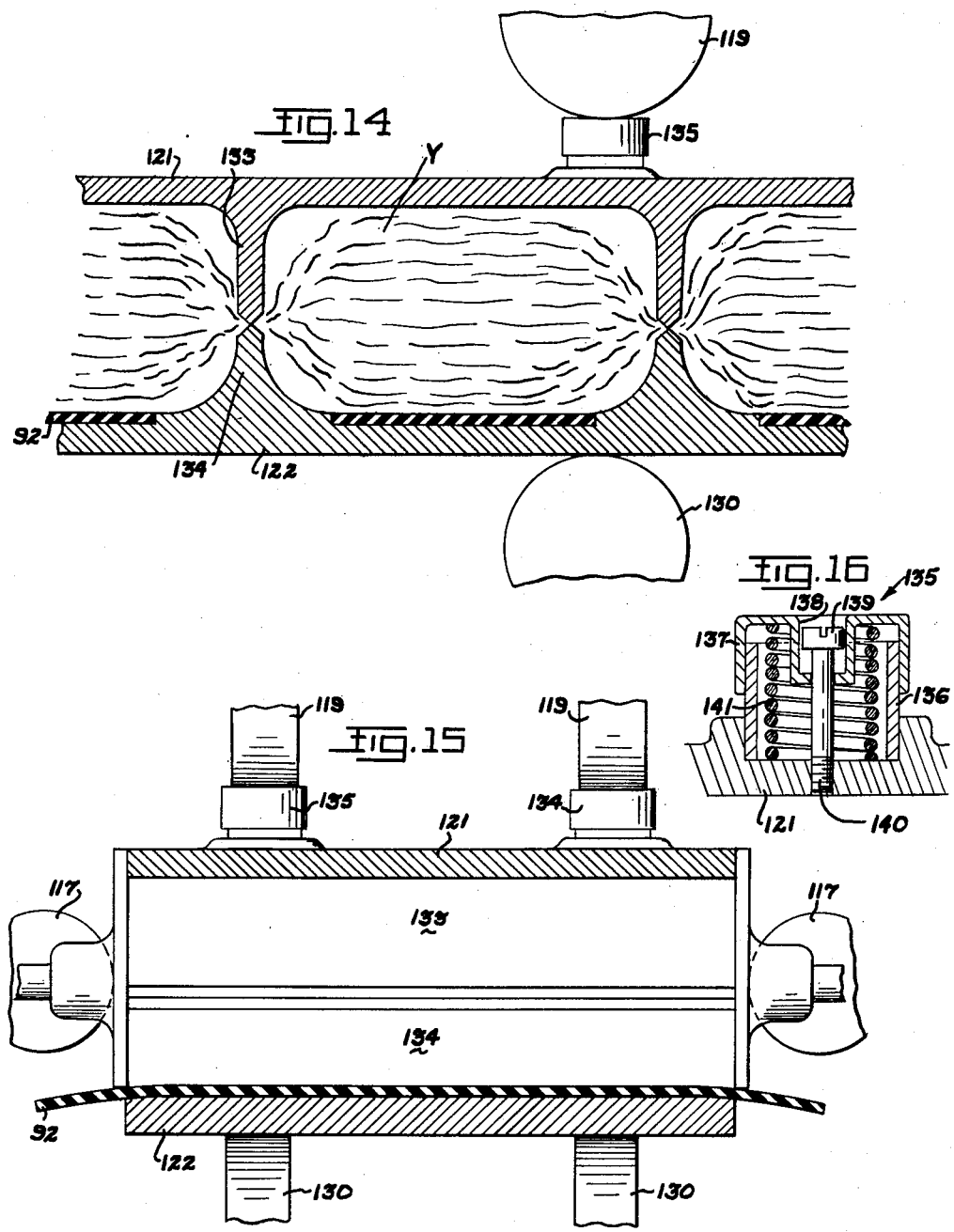
INVENTOR
SCOTT H. PERKY
BY Toulmin & Toulmin
ATTORNEYS

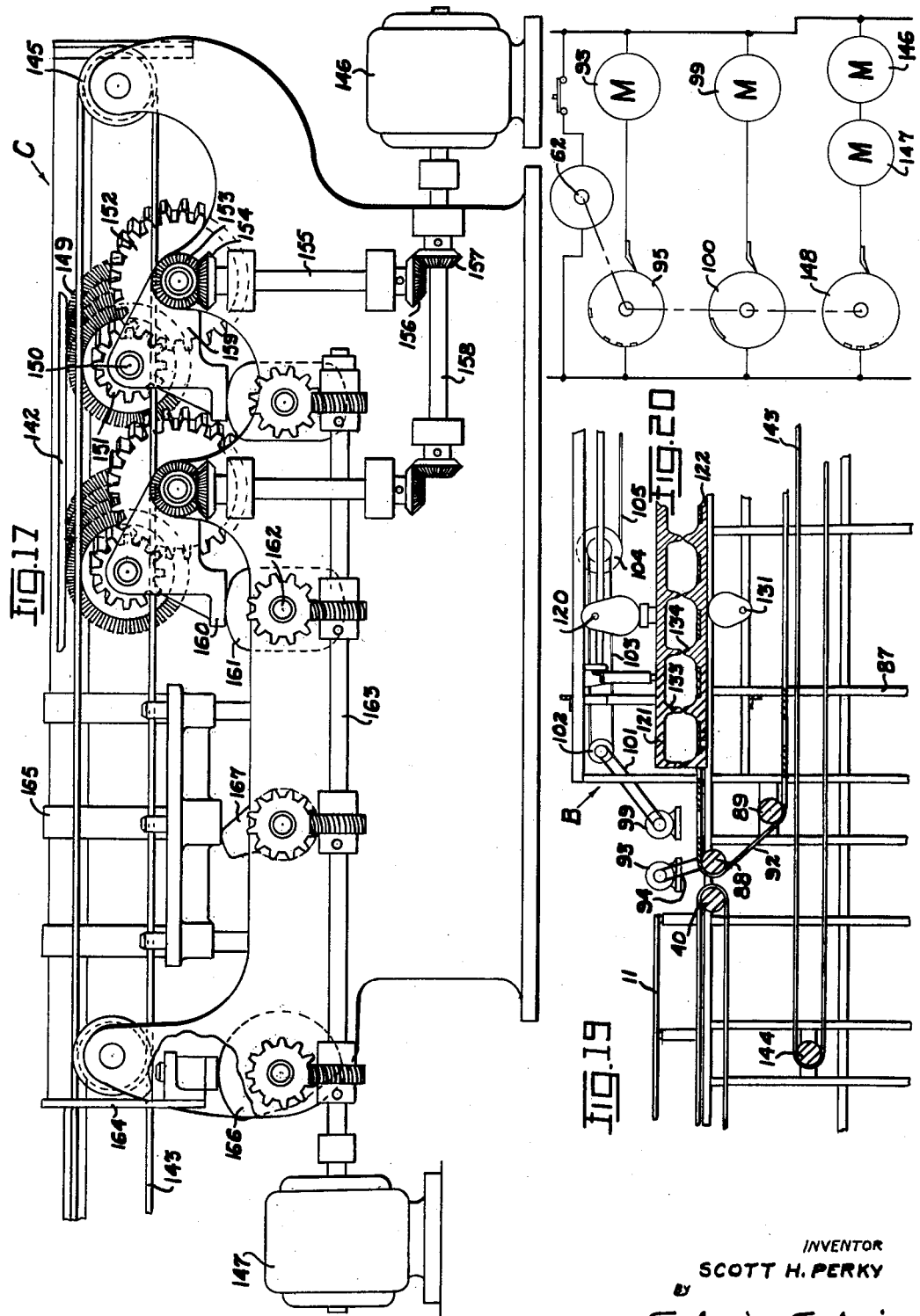

United States Patent Office 2,736,275
Patented Feb. 28, 1956

2,736,275

SHREDDED CEREAL APPARATUS

Scott H. Perky, Keeseville, N. Y.

Application August 16, 1948, Serial No. 44,508

13 Claims. (Cl. 107—2)

The present invention deals with the manufacture of cereals in shredded biscuit form, and is concerned primarily with the production of multi-layer biscuits using only a single pair of shredding rolls.

At the present time the sale of shredded cereal in multi-layer biscuit form, such as shredded wheat, is widespread over the entire country and the production of these shredded cereal biscuits on a commercial basis involves the use of extensive apparatus.

The reason for the large size of the installations which are necessary to produce shredded cereals of the type indicated will become apparent from a brief description of the methods now employed.

Dough of a proper consistency is delivered from a hopper to the bite of a pair of shredding rolls. One of these rolls is grooved and as the dough emerges therefrom it takes the form of a series or layer of shreds. This layer of shreds is delivered on to an appropriate conveyor such as an endless belt.

Additional layers are then delivered in succession on top of the first layer and a shredded cereal structure is thus built up until a sufficient number of layers have been supplied to provide the thickness which is desired in the product.

Thus, if a biscuit is to have twenty-four layers of the shreds, the apparatus must include twenty-four pairs of the shredding rolls, and obviously any such apparatus is not only extensive as to size and space occupied, but also is quite expensive with the result that very large capital expenditures have been required to produce shredded cereal biscuits on a commercial basis.

With the foregoing conditions in mind this invention has in view as its primal objective the provision of apparatus for producing shredded cereal in biscuit form which is characterized by the fact that it includes only a single pair of the shredding rolls.

Apparatus for producing shredded cereal biscuits requires not only a machine for building up a required number of layers of shreds, but also a cutting machine which receives the built-up layer structure from the first machine and in which the shredded layer structure is cut and formed into biscuits, and a depositing machine which manipulates trays or pans so that they receive the cut biscuits in an orderly arrangement, and which trays or pans are adapted for reception in a baking oven. Apparatus embodying the invention includes provision for carrying on these successive operations in a continuous, synchronized manner.

Another highly important object of the invention is the provision in apparatus of the type indicated of a pair of shredding rolls, together with a reciprocating member for receiving the shreds as they come from the rolls and building them up into a structure comprising superimposed layers of the shreds and then automatically delivering the shredded cereal structure to the cutting machine without interrupting the deposition of the shreds on the reciprocating conveyor.

More in detail, the invention has as an object the provision, in a machine of the character aforesaid, of an endless conveyor in the form of a belt of sufficient width to receive a layer of shreds together with mechanism for imparting a predetermined number of reciprocatory movements to said conveyor to build up the layer structure thereon, and timing mechanism which then effects the conveyor to move the superimposed layers from beneath the shredding rolls and deliver them to a biscuit cutting machine.

A further object of the invention is the provision of an apparatus for producing a shredded cereal biscuit product of the type indicated wherein the shreds in alternate layers are substantially straight, while the shreds in the other alternate layers have a wavy or ripple formation, with the result that the structure of the final product is improved.

Other combinations of straight and wavy shreds also might be desirable. An example of such a combination is a biscuit having three or four layers of straight shreds, then three or four layers of wavy shreds, with a topping of wavy shreds to give the ultimate product a wavy appearance.

A machine following the present invention is adapted to the production of such a shredded structure simply by moving the endless conveyor in one direction at a speed greater than it is moved in the other.

Accordingly, a further object of the invention lies in the provision in a machine of the type aforesaid of mechanism controlling the reciprocation of the conveyor and effective to cause the movement in one direction to take place at a speed different from the movement in the opposite direction.

An important feature of the invention is the synchronization of the operation of the layer forming machine with a biscuit cutting machine which preferably includes an endless conveyor for receiving the shredded layer structure and moving it to the cutting zone. The conveyor is formed with openings which are suitably located to provide for the operation of cutting dies which move upwardly and downwardly and cut the shredded layer structure into the biscuit forms. At the same time the shredded layer structure is confined on each side by side plates which are normally maintained spaced from the shredded layer structure, but which are moved into confining engagement therewith upon cutting action of the dies.

The present invention contemplates an arrangement in which the cutting dies may operate either on a shearing principle, in which the cutting edges overlap, or by a mere abutment of the cutting edges. In the latter event over-travel mechanism is included in the die actuating means, so as to insure they are properly forced into abutting relation.

After the biscuits are formed in the cutting machine the dies and side plates are retracted and the biscuits moved forwardly to baking pans which may receive but a single row of biscuits, but preferably a pan manipulating machine is employed which will automatically position a pan so as to receive more than one row of biscuits from the biscuit cutting machine and then deliver said filled pan to a conveyor which goes to the ovens. It is evident that the operation of this pan manipulating machine must be accurately synchronized with the biscuit cutting and forming machine.

Various other more detailed objects and advantages of the invention will in part become apparent and in part be hereinafter stated as the description of the invention proceeds.

For a more complete understanding of the invention, reference may be had to the following description of a practical embodiment thereof and to the accompanying drawings wherein:

Figure 1 is a side view, largely diagrammatic but showing some parts in section and others in elevation, of apparatus designed in accordance with the precepts of this invention;

Figure 2 is a top plan view of the apparatus shown in Figure 1;

Figure 3 is another top plan view but with certain parts removed;

Figure 4 is an enlarged detailed perspective of the layer forming machine and particularly that part thereof where the shredding rolls are located;

Figure 5 is an enlarged detailed view partly in section and partly in elevation showing the hydraulic arrangement for urging the shredding rolls together;

Figure 6 is another perspective on an enlarged scale of the control mechanism associated with the driving roll for the layer forming machine. In this view the casing housing the control mechanism has been broken away and shown in section;

Figure 7 is another enlarged detailed perspective of one end of the biscuit cutting machine with certain parts broken away to more clearly illustrate the essential elements;

Figure 8 is a fragmentary bottom plan view of one end of the shredding rolls and the driving mechanism therefor;

Figure 9 is a plan view of a part of the control mechanism shown in Figure 6;

Figure 10 is a view taken normal to the showing in Figure 9 bringing out the relation of the timing gears;

Figure 11 is a detailed elevational showing of the gear shifting device;

Figure 12 is an elevational showing taken normal to the plane of Figure 11;

Figure 13 is an enlarged detailed view partly in section and partly in elevation of one of the guide rolls for the shredded layer structure;

Figure 14 is a detailed view taken on an enlarged scale of a portion of the cutting dies and actuating cams associated therewith;

Figure 15 is a sectional view taken normal to the showing of Figure 14;

Figure 16 is an enlarged detailed view in section of one of the over-travel mechanisms employed in connection with the cutting dies;

Figure 17 is a perspective view of the pan manipulating machine;

Figure 18 is a top plan view of the pan manipulating machine with the operating parts removed;

Figure 19 is a side view partly in section and partly in elevation showing the relation of the layer forming machine, the biscuit cutting machine, and the conveyor for carrying the pans;

Figure 20 is a wiring diagram showing how the several motors for actuating the various parts are controlled; and Figure 21 is a diagrammatic view showing straight and wavy shreds.

General arrangement

Referring now to the drawings wherein like reference characters denote corresponding parts, and first more particularly to Figures 1, 2 and 3, the apparatus comprises a shredding and layer forming machine, which is identified in its entirety by the reference character A, a biscuit cutting and forming machine indicated at B, and a pan manipulating machine designated C.

It will be noted that the machine A includes an appropriate number of vertical supporting members 10, the particular arrangement of which is not an essential part of the present invention, and which supports, together with the horizontal supporting members 11, define the supporting framework.

Shredding and layer forming machine

Upstanding from the supporting structure 10 and 11, substantially at the central portion thereof, is a frame structure 12 which supports a hopper 13 having a discharge spout 14, the lower end of which defines a long narrow slot.

Dough which is made from the particular cereal desired and of a proper consistency is delivered to the hopper 13 by any appropriate means, the particular dough forming and delivering mechanism not being a part of this invention.

This dough emerges from the slot at the bottom of the spout 14 in the form of an elongated band 15 which is delivered to the bite of a pair of shredding rolls 16 and 17. The roll 16 has an outer cylindrical surface which is smooth, while the roll 17 is formed with a plurality of circumferential grooves 18.

The roll 16 carries at each end a pair of trunnions 19 which are journaled in fixed bearings 20. Moreover, at one side of the machine a gear 21 (see Fig. 8) is drivably connected to the roll 16. The grooved roll 17 also has extended from each end trunnions 22 which are received in blocks 23 (Figs. 4 and 5). The blocks 23 are slidably mounted between guides 24 and bearing against each block is a plunger 25 which is connected to a piston head 26.

The piston head 26 is slidably mounted in a cylinder 27 that is defined by complemental recesses formed in blocks 28 and 29. The block 29 also carries a piston head 30 which is adapted to be actuated by a screw 31.

The cylinder and piston assembly above described and illustrated in Figure 5 is substantially duplicated at both sides of the machine, although it is only necessary that one actuating screw 31 be provided. It will be noted there is a duct 32 communicating with each cylinder 27 and a conduit 33 connects the duct 32 on one side with the corresponding duct on the other side of the machine.

It is evident that this conduit 33 establishes communication between the two cylinders 27, with the result that the hydraulic pressure therein is equally effective on the piston heads 26 to cause the plungers 25 to urge the blocks 23 in a direction moving the roll 17 against roll 16 under pressure. Moreover, this hydraulic pressure may be increased at any time by threading in the screw 31.

It should be noted that the grooved roller 17 drivably carries a gear 34 which meshes with the gear 21 with a fit sufficiently loose to accommodate this slight amount of movement which attends the urging of the two rolls together.

The trunnion 19 at one side of the machine extends through the supporting framework and at its outer end carries another gear 35 which meshes with the pinion 36 that is driven from a motor (not illustrated) which may be mounted within the casing shown at 37. This casing 37 also houses the gears which drive the shredding rolls 16 and 17.

It is evident that as the strip of dough 15 is subjected to the action of the shredding rolls 16 and 17 it is formed into shreds by the grooves 18. In order to definitely assure that the shreds will come free of the grooves 18, a comb shown at 38 in Figures 4 and 8, is provided. This comb 38 has teeth which conform to the grooves 18 and which are received therein. These teeth scrape the shreds loose and cause them to fall downwardly on an endless conveyor now to be described.

The supporting framework 10 and 11 at one end of the machine carries a roller 39 that is freely journaled in the supporting framework and at the opposite end a drive roll 40 (see Fig. 6). Passing over these rollers 39 and 40 is an endless conveyor 41, the top reach of which receives the shreds coming from the shredding rolls. These shreds are shown in Figure 4 as being built up into a structure comprising a plurality of superimposed layers which structure is designated S.

In order to accomplish this it is necessary that the top reach of the conveyor 41 be reciprocated. This is in turn accomplished by controlling the drive to the driving roll 40.

Referring now more particularly to Figure 6 which will be considered along with Figures 9 to 11, inclusive, a shaft 42 is shown as extending from one end of the driving roll 40 to which it is drivably connected and into a casing 43 which houses the control mechanism.

That portion of the shaft 42 which is received in the casing 43 is journaled in a side wall 44 and a central partition 45 and is splined as represented at 46. Slidably mounted on this splined shaft 46 is a compound gear made up of a large gear 47 and a smaller pinion 48.

This compound gear 47 and 48 is adapted to be shifted by a yoke 49 which carries on its underface a guide 50 that is received in a way 51 formed in a supporting block 52. The yoke 49 is actuated by a lever 53, the upper end of this lever being connected to the yoke 49 by the pin and slot connection shown at 54. The lower end of the lever 53 is pivotally mounted on a bracket 55 that is carried by the bottom wall of the casing.

Connected to this arm 53 midway thereof, as by the pivotal connection shown at 56, is a link 57 which at its other end is connected to the back of another yoke 58 which is mounted for sliding movement between guiding brackets 59 and 60.

Figures 11 and 12 depict somewhat diagrammatically the construction of this yoke 58 and the relation thereto of a cam 61. The cam 61 is shown as drivably mounted on a control shaft 62, and outstanding therefrom are a pair of cams 63 and 64, located at opposite edges of the periphery of the cam disk.

The yoke 58 has a top arm 65 which at its free end and at one side carries a projection 66 which is adapted to be engaged by the cam 64, but not by the cam 63. Likewise the yoke 58 has a bottom arm 67 which carries at one side a projection 68 that is adapted for engagement by the cam 63 alone. It will be noted that the projection 66 is at one side of the yoke whereas the projection 68 is at the opposite side.

Briefly describing at this point the operation of the mechanism for shifting the compound gear 47 and 48, it is noted that as the shaft 62 is rotated the cam 64 engages the projection 66 so as to move the yoke 58 to the right, speaking with reference to the showing of Figure 6, or to the left, speaking with reference to the showing of Figure 11.

This movement is transmitted through the link 57 to the lever 53 and from the latter to the yoke 49 and compound gear 47, 48 which are moved to the right as shown in Fig. 6. As rotation of the shaft continues the cam 63 will engage the projection 68 and move the compound gear back to its original position.

A tubular shaft 69 is journaled in appropriate bearings carried by the central partition 45 and rotatably mounted in this tubular shaft 69 is an inner shaft 70 which is continued out to the side wall 71 of the casing in which it is journaled.

The end of the shaft 70 adjacent to the wall 44 drivably carries a gear 72 and a gear sector 73 each adapted to be engaged by the gear 47 of the compound gear 47—48 when the latter is shifted to establish such engagement.

The tubular sleeve 69 carries a gear sector 74 which under certain conditions engages the pinion 48. The end of the tubular sleeve 69 remote from the gear sector 73 drivably carries a bevel gear 75, while the shaft 70 drivably carries a complemental gear 76.

Meshing with the bevel gears 75 and 76 is a bevel gear 77 which is drivably mounted on a shaft 78 that carries a large gear 79. This gear 79 is driven by a pinion 80 mounted on the drive shaft of a motor 81.

The shaft 78 is continued past the gear 79 and at its free end carries a worm gear 82 that meshes with a complemental worm 83 drivably mounted on a shaft 84. This shaft 84 also carries another worm 85 that meshes with a worm gear 86 mounted on the shaft 62.

At this point it is deemed advisable to briefly summarize the operation of the control mechanism in the casing 43 which provides for reciprocation of the conveyor 41, and after a predetermined number of reciprocations continues the movement in one direction far enough to remove one of the structures S from beneath the shredding rolls 16 and 17.

With the motor 81 in operation the pinion 80, gear 79 and shaft 78 drive the bevel gear 77 and both the bevel gears 75 and 76, the shaft 70 being driven in one direction and the tubular shaft 69 in the opposite direction.

Thus, the gear sector 73 when it engages the gear 47 will drive the shaft 42 and roll 40 so as to move the belt 41 in one direction at a predetermined speed and for a predetermined distance.

At the moment the gear sector 73 becomes disengaged from the gear 47 the gear sector 74 engages the pinion 48, but it is to be remembered the gear sector 74 is being driven in a reverse direction by the tubular shaft 69. Thus, the belt 41 is driven in a reverse direction.

Upon referring to Figure 10 it will be noted that the gear sector 74 is of larger diameter than the gear sector 73. This means that when the belt 41 is being actuated by the gear sector 74 it will be moved at a relatively high rate of speed. This will result in the straight shreds at *a* in Figure 21. However, when the belt is moved in the opposite direction at a slower rate of speed by the gear sector 73 the shreds will assume the wavy or ripple formation illustrated at *b* in Figure 1. This is because the shreds are being delivered at a constant rate from the shredding rolls 16 and 17.

Even though the belt is being moved at a slower rate it still must move the same distance so as to provide layers of uniform length in the structure S. Hence, the gear sector 73 is of greater angular extent than the gear sector 74, being shown as somewhat greater than 180 degrees while the gear sector 74 is less than 180 degrees as illustrated in Figure 10.

This reciprocation of the belt 41 caused by the gears 73 and 74 will continue until the cam 63 engages the projection 68. This time will be delayed by the reduction gearing made up of worms 82 and 83, worm 85 and worm gear 86 until a predetermined number of layers have been built up on the conveyor 41. However, when this point is reached the cam 63 will shift the yoke 58 to the left, speaking with reference to the showing of Figure 6.

Thus, the gears 47, 48 are disengaged from the sectors 73, 74 and the gear 47 is engaged with the gear 72 to impart enough continued movement in the proper direction to move the structure S from beneath the shredding rolls 16 and 17 and to deliver it to the cutting and forming machine B. The gears 47 and 72 are engaged only for a very short interval because the projection 64 will now strike the projection 66 and return the yoke 58 to its original position in which the compound gear is shifted to its normal position which is out of engagement with the gear 72. After delivery of the structure S the conveyor 41 again reciprocates starting the formation of another structure S. As the rolls 16 and 18 must continue to rotate at a constant speed, the shreds are severed by pulling apart due to the reversing action of conveyor 41. The distance from the point of depositing of shreds beneath the rolls to the delivering end of the conveyor 41 is equal to the length of one reciprocating stroke. It will be evident that during the forward movement of the conveyor which delivers the structure S to the cutting machine, the shreds continue to deposit on the conveyor without interruption. Hence the first layer of a second structure S is being deposited simultaneously with the removal of the completed structure S from the zone of reciprocation beneath the shredding rolls.

*Cutting and forming machine*

Referring for the moment more particularly to Figure 19, the cutting and forming machine B is shown as including the supporting structure represented at 87. Carried by this structure 87 are rollers 88, 89, 90 and 91 (see Figure 1). Passing over these rollers 88, 89, 90 and 91 is an endless conveyor 92. This conveyor 92 is driven by the roller 88 which will be considered as the drive roller.

As shown in Figure 19 this drive roller 88 is driven from an electric motor 93 with the driving connections between the motor 93 and roller 88 being represented by the drive belt shown at 94.

It is important that the conveyor 92 be started in operation at that time when the structure S is to be removed from the layer forming machine A. Thus, the control shaft 62 also carries a timer represented at 95 and this timer is included in the circuit of the motor 93 as is brought out in the diagrammatic showing in Figure 20.

Thus, the conveyor 92 will be moved just sufficiently far to bring the structure S beneath the cutting dies, which will now be described, hold the structure stationary while the dies operate thereon and then move the formed biscuits from beneath the cutting dies.

It is to be remembered that the structure S must be properly confined at its sides as it is moved into position for the cutting operation. To this end a plurality of rollers 96 are mounted along each side of the belt 41 in a vertical position.

Each roller 96 is journaled on a shaft 97 that depends from the supporting structure and as shown in Figure 13 the lower edge of each roller is formed with a flange 98, one side edge of which is in engagement with the belt 41. Thus, movement of the belt 41 rotates the rollers 96 in a proper direction to eliminate any friction between the rollers and the sides of the shredded structure S.

Referring again to Figure 19 a motor is represented at 99 and it is this motor which drives the cutting dies and associated instrumentalities. The operation of this motor 99 is in turn controlled by a timer 100 which is mounted on the shaft 62 (see Figure 6). Moreover, as shown in Figure 20, the timer 100 is included in the circuit of the motor 99.

As represented in Figure 19 a drive belt 101 extends from the motor 99 to a drive sprocket represented at 102. An endless chain 103 drivably connects the sprocket 102 with another drive sprocket represented at 104 which in turn drives an endless chain 105.

Referring now more particularly to Figure 7, chain 105 is shown as passing over a sprocket 106 drivably mounted on a shaft 107. The latter extends across the machine B with appropriate journaling in the supporting structure 87 and at each end drivably carries a bevel gear 108. At each side of the machine there is a short shaft 109 which is journaled in the structure 87 and each shaft 109 carries a bevel gear 110 that meshes with the respective gear 108.

At the opposite end of each shaft 109 there is another bevel gear 111 which meshes with a complemental bevel gear 112 drivably mounted on a shaft 113 that is journaled in the supporting structure 87.

The lower end of each shaft 113 carries a bevel gear 114 that meshes with a complemental bevel gear 115 drivably mounted on the end of a shaft 116. There is a shaft 116 at each side of the machine and these shafts extend substantially along the length of the cutting instrumentalities. Keyed to each of these shafts 116 are a plurality of cams 117 which normally engage side plates 118 to urge the latter inwardly when the shafts 116 are driven.

Figure 7 shows only a single shaft extending across the front end of the cutting machine B. This shaft 107 carries cutter actuating cams 119, and a similar arrangement may be employed as at the shaft shown at 120 in Figure 19. This shaft 120 drivably carries a plurality of the cams 119 and is driven by the chain 103.

The cutting instrumentalities proper comprise an upper die 121 and a lower die 122. Under normal conditions the upper die 121 is retained in its upper retracted position by springs 123, each of these springs having a lower end connected to the upper die and an upper end connected to the supporting structure 87. The lower die 122 ordinarily assumes a lower retracted position under gravity action.

Referring again to Figure 7, it will be noted that the shaft 113 on one side of the machine is continued down past the bevel gear 114 to the underside of the horizontal part of the framework, where it drivably carries another bevel gear 124. The latter meshes with a complemental gear 125 drivably mounted on a shaft 126 that is journaled in the framework. The other end of the shaft 126 drivably carries a bevel gear 127 that meshes with a complemental gear 128 drivably carried on a shaft 129 that extends across the machine beneath the lower cutting die 122. This shaft 129 carries a pair of cams 130 which bear against the underface of the die 122 and which are adapted to urge this die upwardly.

This arrangement for providing the cams 130 and their operation may also be duplicated at a shaft shown at 131 in Figure 19, which is substantially opposite the shaft 129 located at the top.

The belt 92 is formed with a plurality of large openings 132 to accommodate the cutting edges of the lower die 122.

Referring now more particularly to Figure 14 the upper cutting die 121 is shown as carrying on its underface a plurality of transversely extending vertical ribs 133, the lower free edges of which are formed with sharp cutting edges.

Likewise, the lower cutting die 122 is formed with a corresponding number of similarly located upstanding transverse ribs 134, having upper cutting edges adapted to abut the cutting edges on the ribs 133. It is these ribs 134 which pass through the openings 132 in the belt.

In order to insure of proper abutment of the cutting edges the over-travel arrangement shown at 135 may be employed in conjunction with the cams 119. One of these over-travel units is shown in detail in Figure 16. It comprises an upstanding cylindrical casing 136 that is carried by the upper die 121. Telescoping over this cylindrical casing 136 is a cup shaped member 137 having a central depressed part 138 that accommodates the head 139 of a bolt 140.

An expansion coil spring 141 is positioned in the casing 136 and normally urges the cup shaped cap 137 upwardly, that is, away from the die 121. However, this upward movement is limited by the bolt head 139. The cam 119 engages the cap 137 so that its downward movement is transmitted through the spring 141 to the die 121.

At this point it is deemed advisable to summarize the operation of the biscuit cutting machine. It will be recalled that the conveyor 92 is brought into proper operation to bring the shredded structure S from the machine A on to the conveyor 92 and into a position between the retracted dies 121 and 122. At this point the movement of the conveyor 92 stops and the motor 99 starts the cutting instrumentalities into operation.

The upper die 121 is forced downwardly by the cams 119, while the lower die 122 is forced upwardly by the cams 130. At the same time the side plates 118 are moved inwardly by the cams 117. The operation of all of these cams is taking place simultaneously through the driving connections illustrated and described.

The shredded structure S is now cut into individual biscuits such as is represented at Y as shown in Figure 14. The motor 99 is continued in operation by its timer 100 just sufficiently long to move the dies into engagement and then permit of their retraction and separation.

At this point its operation is discontinued and the motor 93 is again brought into operation to actuate the belt 92 and remove the cut biscuits from the cutting dies.

Pan manipulating machine

While it would be possible and entirely practical to utilize an arrangement in which a pan receives but a single row of the biscuits Y which have been cut by the machine B, it is preferred to deliver a plurality of rows of biscuits into each pan.

In the form of the invention illustrated in Figures 17 and 18 provision is made for accommodating three rows of biscuits on each pan.

First referring to Figures 1 and 2, the endless conveyor 92 from the machine B is shown as extending in a downwardly inclined direction over a part of the mechanism of the conveyor C.

A pan for receiving the biscuits is represented at 142 (Figure 18). The pan 142 is carried by an endless conveyor made up of the spaced belts 143. As shown in Figures 1 and 19 these belts 143 are mounted on the rollers 144 and 145 and are constantly driven in the direction indicated by the arrows in Figure 18. A plurality of these pans may be supplied to the conveyor 143 in any preferred manner such as manual.

As the pan 142 comes out from beneath the end of the conveyor 92 a row of biscuits Y is delivered thereto along one side thereof. This movement of the pans 142 is continued until a complete row of biscuits is laid from one end to the other in the pan.

At this point motors 146 and 147 are brought into operation by the timer mechanism shown at 148 in Figures 6 and 20. These motors cause brushes represented at 149 to be raised and engage the underface of the pans 142, lift them from the conveyor 143, and move them laterally and back into a position in which the front edge of the pan comes substantially beneath the front edge of the conveyor 92. This is accomplished in the following manner:

The brushes 149 are mounted on a pair of shafts 150. Each of the shafts 150 drivably carries a pinion 151 that meshes with a gear 152 which drivably carries a bevel gear 153. Meshing with the latter is a complemental gear 154 carried at the upper end of a shaft 155, with the lower end of the shaft carrying a bevel gear 156 that meshes with a complemental gear 157.

It will be noted there is a bevel gear 157 for each of the two shafts 155 and these bevel gears 157 are mounted on the drive shaft 158 of the motor 146. Thus the motor 146 drives the brushes in a counterclockwise direction, speaking with reference to the showing of Figure 17.

In order to provide for the vertical raising and lowering movement of the brushes 149, the shafts 150 are journaled in brackets 159 which are pivotally mounted on axes concentric with the gears 152. Each of these brackets 159 has a foot 160 that rests on a cam 161. The cams 161 are drivably mounted on shafts 162 which are driven from a motor shaft 163 by suitable gearing. This motor shaft 163 extends from the motor 147.

Thus, at the proper time the brushes are raised and shift the pans backwardly into a position where they are ready to receive the second row of biscuits. This backward reverse movement is limited by stops shown at 164 and 165.

It will be noted that the brushes 149 are inclined at an angle with respect to the direction of movement of the conveyor 143. Thus, the return movement has a sidewise component which is limited by the stops 165 and a direct return component limited by the stops 164.

On the return movement to receive the second or intermediate layer both of these stops are raised into effective position by the cams shown at 166 and 167, respectively. Just as soon as this return movement is achieved, the brushes are lowered and the pans are again moved forwardly by the conveyor 143.

During this brief interval of return movement the conveyor 92 will have been stopped in operation by the timer 100, but as the pan is again in position to receive its second row, the conveyor 92 will again start in operation and a second row of biscuits Y will be delivered on to the pan as the latter moves forwardly out from beneath the lower end of the conveyor 92.

After the second row of biscuits has been delivered, the brushes 149 are again raised and operated to impart return movement to the pan 142. During this movement the stops 165 will not raise as the pan must move completely to the side so as to receive the third or outermost row of biscuits. However, the stops 164 remain in position to limit the return movement.

Again the brushes are lowered and the conveyor 92 started into operation to lay the third row of biscuits on to the pan 142. After this delivery has been completed the pan passes on to the conveyor shown at 168 which goes to the ovens.

It will be noted that during the manipulation of the pan 142 to receive the three rows of biscuits, the stops 164 will remain upraised due to the shape of the cam 166. This prevents any other pan being forced forward into operative position by the conveyor 143. It is to be remembered that the latter will carry an adequate supply of pans.

Summary of operation

From the foregoing it is apparent that the dough from which the shreds are to be made is delivered to the hopper 13 of the machine A. It is shredded by the rolls 16 and 17 and delivered on to the top reach of the reciprocating conveyor 41, which moves in opposite directions at different velocities so as to build up a layer of shreds with one alternate layer straight and the other alternate layer of a wavy ripple formation.

After a shredded structure S is moved into proper relation with respect to the cutting instrumentalities, the conveyor 92 is stopped and the cutting dies 121 and 122 and side plates 118 actuated to cut and form the biscuits.

These cutting dies and side plates are then retracted and the conveyor 92 again started in operation to move the biscuits out from beneath the zone of the cutting instrumentalities. This conveyor 92 then delivers the biscuits in rows on to the pans 142 of the pan manipulating machine C. After each pan 142 has received three rows of biscuits, it is passed by the conveyor 168 to the ovens.

While a preferred specific embodiment of the invention is hereinbefore set forth, it is clearly understood that the invention is not to be limited to the exact constructions, mechanisms and devices illustrated and described, because various modifications of these details may be provided in putting the invention into practice within the purview of the appended claims.

I claim:

1. In apparatus for making multi-layer shredded cereal products of the type having a pair of shredding rolls depositing cereal shreds on a reciprocating support, the combination of an endless conveyor on which the shreds are deposited by said rolls, conveyor-reciprocating means whereby a multi-layer shred structure of a length equal to the reciprocation stroke is built up on a section of said conveyor, conveyor-advancing means for advancing said section of the conveyor beyond its forwardmost position of reciprocation by a distance at least equal to the reciprocation stroke, thereby removing said structure from the shred-depositing zone while depositing the first layer of a second multi-layer structure on a succeeding section of said conveyor, and means for alternately operating said conveyor-reciprocating and conveyor-advancing means to form a plurality of multi-layer structures by continuous deposition of shreds by said pair of rolls.

2. In apparatus for making multi-layer shredded cereal products of the type having a pair of shredding rolls depositing cereal shreds on a reciprocating support, the combination of an endless conveyor on which the shreds are deposited by said rolls, conveyor-reciprocating means whereby a multi-layer shred structure is built upon a reciprocating section of said conveyor, conveyor-advancing means for advancing said reciprocating section beyond its forwardmost position of reciprocation by a distance at least equal to the reciprocation stroke, and control means for alternately connecting said conveyor with said reciprocating means for a predetermined number of reciprocations and then with said advancing means to discharge the formed multi-layer structure from the shred-depositing zone while simultaneously depositing the first layer of a second multi-layer structure on another section of said conveyor.

3. Apparatus for forming multi-layer shredded cereal structures comprising a pair of shredding rolls, a conveyor positioned to receive shreds from said rolls, means for reciprocating said conveyor to form a multi-layer shred structure on a section thereof, means for advancing said conveyor beyond its forwardmost position of reciprocation by a distance at least equal to the length of said section, and control means alternately connecting said reciprocating means and said advancing means with said conveyor whereby multi-layer structures are formed in succession by continuous deposition of shreds by said rolls.

4. Apparatus for forming multi-layer shredded cereal structures comprising a pair of shredding rolls, an endless conveyor positioned to receive shreds from said rolls, conveyor operating means, means for reversing the direction of movement of said operating means at timed intervals to reciprocate said conveyor, and control means operative after a predetermined number of reciprocations to render said reversing means inoperative for a predetermined period during which said conveyor advances in one direction beyond the extreme position of reciprocation thereof in the same direction.

5. Apparatus for forming multi-layer shredded cereal structures comprising a pair of shredding rolls, a conveyor positioned to receive shreds from said rolls, said conveyor having cycles of reciprocating movement and intervening cycles of advancing movement without reciprocation, reversible conveyor operating means for reciprocating said conveyor during said reciprocating cycles, and control means preventing reversal of said operating means during said cycles of advancing movement whereby said conveyor advances beyond its forwardmost position of reciprocation.

6. Apparatus for forming multi-layer shredded cereal structures comprising a pair of shredding rolls, a conveyor positioned to receive shreds from said rolls, said conveyor having cycles of advancing movement and intervening cycles of reciprocating movement without advance, conveyor operating means reversible during said reciprocating cycles at timed intervals providing reciprocating strokes of equal length in both directions, and control means preventing reversal of said operating means during said cycles of advancing movement whereby said conveyor advances beyond its forwardmost position of reciprocation.

7. Apparatus as defined in claim 6, said operating means including means for moving said conveyor at different rates of speed during different reciprocating strokes.

8. Apparatus for forming multi-layer shredded cereal structures comprising a pair of shredding rolls, a conveyor positioned to receive shreds from said rolls, said conveyor having successive periods of advancing movement and intervening cycles of reciprocating movement without advance, a continuously operating conveyor-moving means, reversible driving connections between said moving means and said conveyor for reversing the movement of said conveyor at timed intervals during said reciprocating cycles, and control means providing non-reversible driving connections between said moving means and said conveyor during said periods of advancing movement whereby said conveyor advances beyond its forwardmost position of reciprocation.

9. Apparatus as defined in claim 8, said non-reversible driving connections comprising shiftable gears operated by said control means.

10. Apparatus for forming multi-layer shredded cereal structures comprising a pair of shredding rolls, a conveyor positioned to receive shreds from said rolls, said conveyor having successive periods of advancing movement and intervening cycles of reciprocating movement without advance, power means for moving said conveyor, reversible driving connections between said power means and said conveyor for reversing the direction of movement of said conveyor at timed intervals during said reciprocating cycles, non-reversible driving connections between said power means and said conveyor, and control means driven by said power means at a predetermined speed relative to the movement of said conveyor, said control means operative to disengage said reversible driving connections after a predetermined number of reciprocations of said conveyor and to establish said non-reversible driving connections during said periods of advancing movement whereby said conveyor advances beyond its forwardmost position of reciprocation.

11. Apparatus as defined in claim 10, said reversible driving connections moving said conveyor at different rates of speed in opposite directions and for different periods of time correlated with said different rates to provide reciprocating strokes of equal length in both directions throughout each reciprocating cycle.

12. Apparatus as defined in claim 10, said reversible driving connections comprising a pair of driving shafts rotating in opposite directions and a driving gear sector on each shaft, in combination with a driven shaft having gear means thereon engageable by said sectors whereby said driven shaft is rotated alternately in opposite directions by said sectors during said reciprocating cycles.

13. Apparatus as defined in claim 12 including a driving gear on one of said driving shafts and engageable with said gear means on said driven shaft, said control means shifting said gear means axially to disengage said gear sectors from and engage said driving gear with said gear means during said periods of advancing movement.

References Cited in the file of this patent

UNITED STATES PATENTS

| Number | Name | Date |
|---|---|---|
| 488,752 | Collum | Dec. 27, 1892 |
| 532,480 | Perky | Jan. 15, 1895 |
| 533,555 | Perky | Feb. 5, 1895 |
| 667,892 | Perky | Feb. 12, 1901 |
| 678,625 | Perky | July 16, 1901 |
| 783,075 | Rhoades | Feb. 21, 1905 |
| 1,027,762 | Regnier | May 28, 1912 |
| 1,102,614 | Valentine | July 7, 1914 |
| 1,155,839 | Schneider | Oct. 5, 1915 |
| 1,194,341 | Smith | Aug. 8, 1916 |
| 1,196,241 | Hutzen | Aug. 29, 1916 |
| 1,312,640 | Mallinckrodt | Aug. 12, 1919 |
| 1,334,429 | Anderson | Mar. 23, 1920 |
| 1,592,768 | House | July 13, 1926 |
| 1,621,956 | Schmand | Mar. 22, 1927 |
| 2,008,036 | Pointon et al. | July 16, 1935 |
| 2,155,952 | Noxon et al. | Apr. 25, 1939 |